Figure 1:
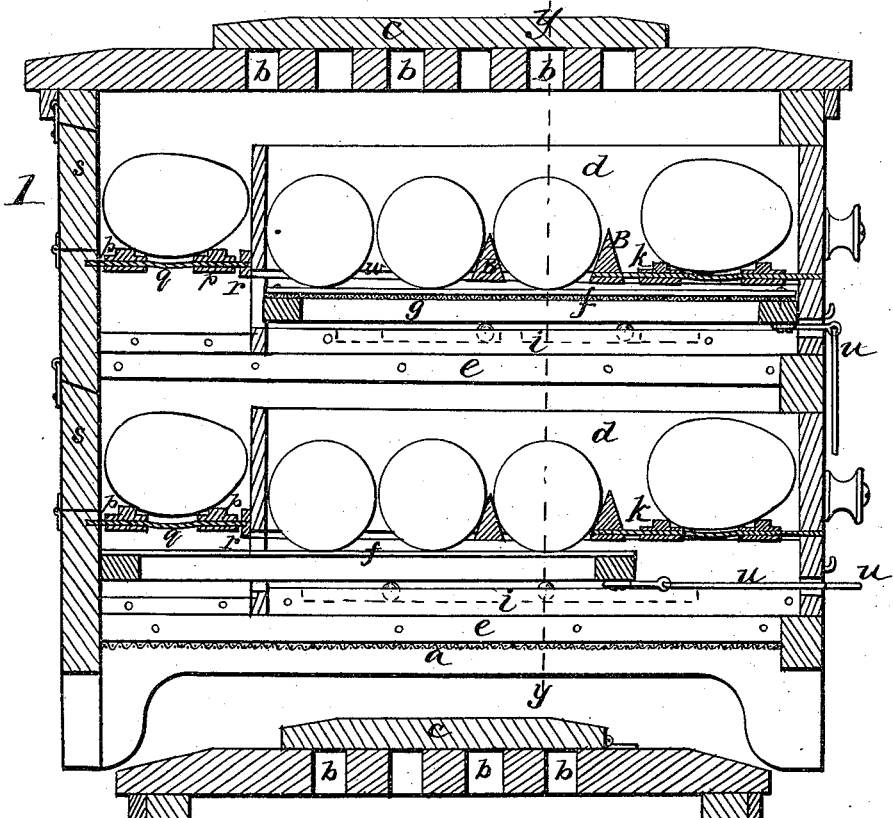

(No Model.) 2 Sheets—Sheet 1.

O. F. BURKE.
EGG PRESERVING CABINET.

No. 354,826. Patented Dec. 21, 1886.

Witnesses:
R. E. Grant
A. R. Avant

Inventor:
Oscar F. Burke
by Johnson and Johnson
Attys.

(No Model.) 2 Sheets—Sheet 2.
O. F. BURKE.
EGG PRESERVING CABINET.
No. 354,826. Patented Dec. 21, 1886.
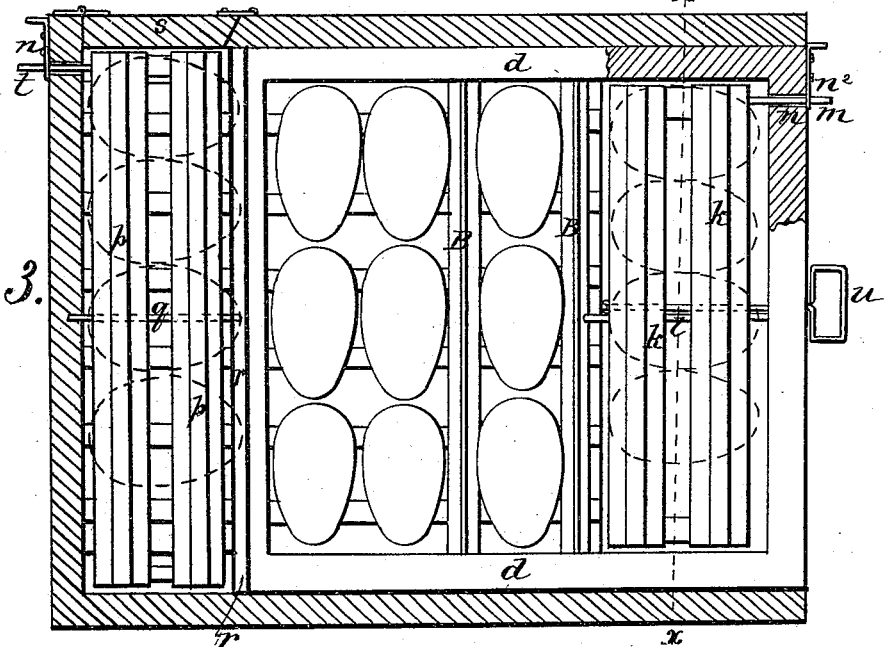
Fig. 3.
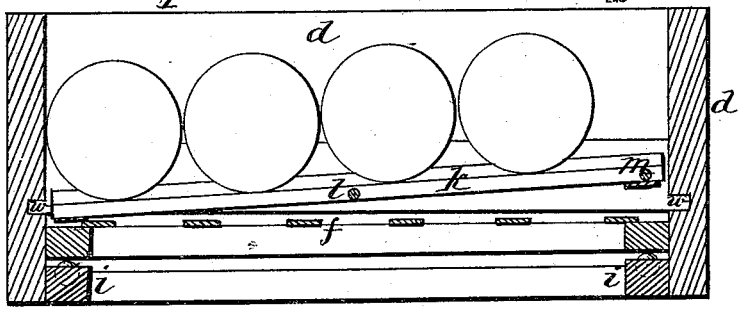
Fig. 4.
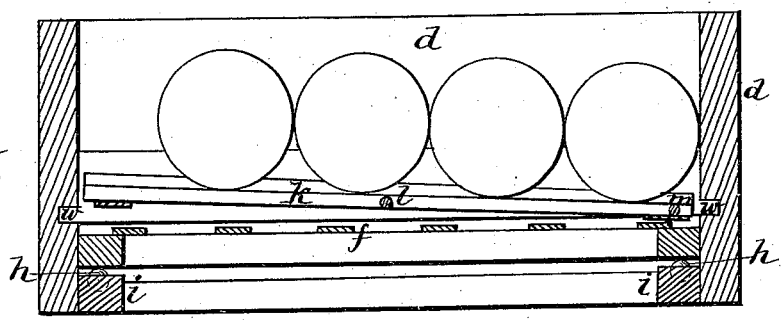
Fig. 5.
Fig. 6.
Witnesses: Inventor:
R. E. Grant Oscar F. Burke
N. R. Avank by his Attys
 Johnson and Johnson

UNITED STATES PATENT OFFICE.

OSCAR FRANK BURKE, OF WAVERLY, NEW YORK.

EGG-PRESERVING CABINET.

SPECIFICATION forming part of Letters Patent No. 354,826, dated December 21, 1886.

Application filed May 24, 1886. Serial No. 293,108. (No model.)

*To all whom it may concern:*

Be it known that I, OSCAR FRANK BURKE, a citizen of the United States, residing at Waverly, in the county of Tioga and State of New York, have invented new and useful Improvements in Egg-Preserving Cabinets, of which the following is a specification.

The object of my improvement is to preserve eggs for the market in the summer season.

I find that eggs can be preserved in warm weather by keeping them in a case, with proper ventilation, in a comparatively moist atmosphere, and frequently changing their positions of rest. In experimenting I found that fresh eggs put at different times in my cabinet, which was placed in a moist atmosphere of about 60°, and all turned daily by a gentle movement, so as to change their positions of rest, were at the end of six months in good condition, the first put in being as sound as the last.

My improvement consists in the construction of the cabinet in particulars which I shall now proceed to describe, and specifically point out in the claims.

Provision is made to give the desired ventilation, moisture, and temperature by the evaporation of water at the bottom of the cabinet, when the latter is placed in a dry air, and thus prevent the shrinkage of the eggs by drying. The eggs are contained in drawers which are each provided with a sliding and a tilting bottom, which, when moved, give a half-circle rolling movement to the eggs, so as to cause them to change their positions of rest at least once in twenty-four hours, and thus prevent the yelks from settling through the white of the eggs in contact with the shell. The tilting bottom is placed crosswise at the front of the drawer above the sliding bottom, and thus utilizes that portion of the drawer which is necessary to allow for the movement of its open bottom within the cabinet to roll the eggs, as stated. This utilization of the drawer-space and of the cabinet-space by tilting bottoms is important in greatly increasing its capacity as a closure for eggs arranged to be rolled in the direction of the movement of the drawer and in the direction at right angles to such movement, because in a cabinet holding from five hundred to a thousand eggs, arranged so that each can be rolled at least a half-revolution, space is a very important consideration, in connection with facility for access to the drawers and to the cabinet, to place and remove the eggs, and for operating the bottoms of the same drawer and cabinet at different sides of the cabinet.

Figure 2:
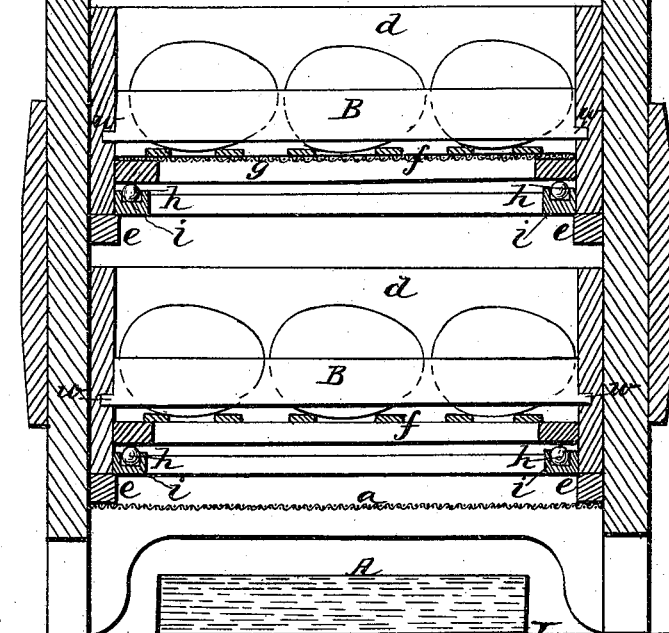

Referring to the accompanying drawings, Figure 1 represents a vertical section of an egg-preserving cabinet, showing the drawers and case having both sliding and tilting bottoms; Fig. 2, a cross-section of the same, taken through the sliding bottoms of the drawers; Fig. 3, a top view, with the cover removed, showing the sliding and tilting bottoms; Fig. 4, a cross-section taken on the line *x x* of Fig. 3, showing the tilting bottom of the drawer; Fig. 5, a similar view showing the tilting-drawer bottom in a different position; and Fig. 6 is a detail view showing the handles for operating the sliding and tilting bottoms of the drawer.

The cabinet is constructed of any desired capacity, like a square box open at the bottom, and may have two or more tiers of drawers, arranged to open at the front of the case.

At the bottom the cabinet is provided with a wire screen, *a*, to exclude rats and vermin, while the top has openings *b*, to afford free ventilation through the drawers, and a lid, *c*, to close said openings and prevent a draft through the drawers when the cabinet is placed in a damp cool cellar. When placed in a dry atmosphere, then I place a pan of water, A, under the cabinet to cool and render the air moist by evaporation, so as to produce a draft through the top openings, as shown in Fig. 2.

The drawers *d* are supported upon cleats *e* on the inner side walls of the case, one above the other, and each drawer is provided with a slide-bottom, *f*, consisting of a frame of slats, and, if preferred, also a wire covering, *g*, as shown. These slide-bottoms are supported upon balls *h*, confined in grooves in cleats *i* at each side of the drawer, as shown in Fig. 2, so as to give an easy movement to the bottom, which is caused to slide in and out of the drawer a certain distance from its rear end in the space of the cabinet, as shown in Fig. 1. Above the slide-bottom the drawer is provided with cross slats or bars B, so as to divide it into spaces to receive one or more rows of eggs and allow them to rest upon the slats $f$ of the slide-bottoms, as shown in Figs. 1 and 3. These cross-slats are secured in grooves $w$ in the sides of the drawers, so that they may be set nearer to or farther from each other, as may be desired. Now, as the slide-bottom $f$ is moved in and out, it acts to give a rolling motion to the eggs resting thereon, as the eggs cannot be carried with the bottom. For this purpose the slatted bottom $f$ is moved from the front out at the rear side of the drawer a distance sufficient to give the eggs a half-revolution, so as to reverse their positions. This movement of the slatted bottom requires lost space in the cabinet at the inner ends of the drawers and lost space in the drawers at the front ends thereof, as shown in Fig. 1. I provide for utilizing these spaces by arranging in the space at the front ends of the drawer a transverse tilting bottom, $k$, so as not to interrupt the sliding movement of the drawer-bottom while carrying a row of eggs above it, and causing them to roll thereon from one end to the other as the bottom may be tilted in first one direction and then in the other. This tilting bottom is pivoted by a pin, $l$, to the front end of the drawer and to the front cross-slat or bar, B. A pin, $m$, extending from one end of this tilting bottom passes through a slot, $n$, in the front of the drawer and serves as the means for operating this tilting bottom, and a latch, $m'$, may be used to hold the tilting bottom when set, by being slid under or over the pin, as shown in Fig. 6. I also arrange in the cabinet behind each drawer, and above the plane of the sliding bottom thereof, a similar tilting bottom, $p$, pivoted by a pin, $q$, to the rear side of the cabinet and to a cross-bar, $r$, so as to be tilted at right angles to the movement of the slide-bottom, to cause a row of eggs placed thereon to roll from one end to the other as this cross-frame may be tilted first toward one side of the cabinet and then to the other. Access is had to supply these rear tilting frames with eggs and to remove them by means of doors $s$ in the side of the case, the end of each tilting frame having a projecting pin, $t$, passing through a slot in the case, and held when set by a latch, the same as the front cross-tilting bottom of the drawer. In this way all the space in the cabinet is utilized, with a movable surface upon which the eggs may be rolled as often as may be required. These tilting frames are not entirely filled with eggs, but a sufficient space is left at the end of the row to permit each egg to roll over, a space sufficient to turn it about half a revolution, and in effecting this the frames can be turned very gently.

The tilting bottoms of the drawers may be operated by opening the drawers, but I prefer to operate them from the outside of the case, so that the cabinet may be locked and the eggs changed in their positions from day to day without opening the case.

A handle, $u$, connected to the sliding bottom, extends through an opening in the front end of the drawer, and serves to operate the bottom as often as may be required, and at the same time the tilting bottoms are operated. The tilting bottoms are made of any suitable open frames or joined slats, so that the rows of eggs thereon will rest against one or the other inner vertical side of the drawer, or upon one or the other inner vertical wall of the cabinet.

The construction thus described gives a compact arrangement of tables or surfaces adapted by their movements in different directions to change the positions of the eggs thereon, both in the drawers and in the space in the cabinet outside of the drawers, and thus renders it possible to construct the cabinet of comparatively small size with large capacity.

The rolling of eggs to change their positions of rest between fixed bars by a horizontal sliding frame, upon which the eggs are supported in rows between said fixed bars, is old in incubators in a case closed for retaining the heat; and a tilting frame has been used in incubators to change the positions of the eggs by a rolling movement by tilting the frame from the outside, and these things I do not claim specifically as egg-turning devices used in the artificial hatching of chickens in a heated closed case.

Access may be had to the rear tilting bottoms by doors in the rear side of the cabinet.

It will be understood that the drawers do not extend back to the rear wall of the cabinet, because space must be left for the movement of their sliding bottoms, and the arrangement in this space of tilting frames gives the cabinet a double front, and renders it complete as a storage closure for preserving eggs.

I claim—

1. An egg-preserving cabinet consisting of the case open at the bottom and one or more drawers, each having a sliding open bottom and fixed cross-bars, and a tilting open bottom arranged at the front of the drawer in a horizontal plane above the sliding bottom, as described, and for the purpose specified.

2. An egg-preserving cabinet consisting of the case open at the bottom, one or more drawers, each having both a sliding and a tilting open bottom, and tilting open bottoms arranged within the case in rear of and independent of the drawers, the said cabinet having provision on different sides for access to the said moving bottoms, substantially as described.

3. In an egg-preserving cabinet, the case having an open bottom, covering $a$, top openings, $b$, and lid $c$, the drawers each having a sliding bottom, and the drawers and the case having tilting bottoms arranged above the plane of the sliding bottoms and at right angles to the direction of the movements of the said sliding bottoms, substantially as described.

In testimony whereof I have hereunto set my hand in the presence of two subscribing witnesses.

OSCAR FRANK BURKE.

Witnesses:
A. E. H. JOHNSON,
J. W. HAMILTON JOHNSON.